United States Patent
Hecker et al.

(10) Patent No.: US 11,332,158 B2
(45) Date of Patent: May 17, 2022

(54) SYSTEM FOR THE AT LEAST PARTIALLY AUTONOMOUS OPERATION OF A MOTOR VEHICLE WITH DOUBLE REDUNDANCY

(71) Applicant: KNORR-BREMSE SYSTEME FUER NUTZFAHRZEUGE GMBH, Munich (DE)

(72) Inventors: Falk Hecker, Markgröningen (DE); Adnan Mustapha, Maulbronn (DE); Oliver Jundt, Hessigheim (DE); Ulrich Guecker, Schwieberdingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 170 days.

(21) Appl. No.: 16/761,531

(22) PCT Filed: Nov. 8, 2018

(86) PCT No.: PCT/EP2018/080688
§ 371 (c)(1),
(2) Date: May 5, 2020

(87) PCT Pub. No.: WO2019/092150
PCT Pub. Date: May 16, 2019

(65) Prior Publication Data
US 2021/0171062 A1    Jun. 10, 2021

(30) Foreign Application Priority Data
Nov. 10, 2017 (DE) ................... 10 2017 010 716.5

(51) Int. Cl.
*B60W 60/00* (2020.01)
*B60W 10/06* (2006.01)
(Continued)

(52) U.S. Cl.
CPC ........ *B60W 60/0015* (2020.02); *B60W 10/06* (2013.01); *B60W 10/18* (2013.01);
(Continued)

(58) Field of Classification Search
CPC .......... B60T 2210/32; B60T 2270/402; B60T 2270/406; B60T 7/12; B60T 8/885;
(Continued)

(56) References Cited

U.S. PATENT DOCUMENTS 6,015,193 A    1/2000  Vogel et al.
9,195,232 B1 * 11/2015  Egnor .................. B60W 10/20
(Continued)

FOREIGN PATENT DOCUMENTS

DE    3906846 A1    9/1990
DE    19526250 A1    1/1997
(Continued)

OTHER PUBLICATIONS

International Search Report dated Feb. 15, 2019 of the corresponding International Application PCT/EP2018/080688.

*Primary Examiner* — Babar Sarwar
(74) *Attorney, Agent, or Firm* — Norton Rose Fulbright US LLP; Gerard Messina

(57) ABSTRACT

A system for controlling at least partially autonomous operation of a motor-vehicle, including: a sensor-device with which environment-data characterizing the environment of the motor vehicle is generated; an electronic-main-control-unit, which receives the environment-data from the sensor-device, and, depending on the data, inputs adjusting-commands into at least one device/actuator, which device/actuator is used in the at least partially autonomous operation of the motor-vehicle; a first electronic-backup-control-unit, which, for a fault/failure of the electronic-main-control-unit, receives the data from the sensor-device, (Continued)

and, depending on the data, inputs adjusting-commands into the at least one device/actuator, which device/actuator is used in the at least partially autonomous operation of the motor-vehicle; and a second electronic-backup-control-unit, which, for a fault/failure of the electronic-main-control-unit and the first electronic-backup-control-unit, receives the data from the sensor-device, and, depending on the data, inputs adjusting-commands into the at least one device/actuator, which device/actuator is used in the operation of the motor-vehicle.

15 Claims, 1 Drawing Sheet

(51) Int. Cl.
  *B60W 10/18* (2012.01)
  *B60W 10/20* (2006.01)
  *B60W 10/26* (2006.01)
  *B60W 30/09* (2012.01)
  *B60W 30/095* (2012.01)
  *B60W 50/02* (2012.01)
  *B60W 50/029* (2012.01)

(52) U.S. Cl.
  CPC ............ *B60W 10/20* (2013.01); *B60W 10/26* (2013.01); *B60W 30/09* (2013.01); *B60W 30/0956* (2013.01); *B60W 50/0205* (2013.01); *B60W 50/029* (2013.01); *B60W 2420/42* (2013.01); *B60W 2420/52* (2013.01); *B60W 2420/54* (2013.01); *B60W 2554/4041* (2020.02); *B60W 2554/4042* (2020.02); *B60W 2554/4044* (2020.02)

(58) Field of Classification Search
  CPC ...... B60W 10/06; B60W 10/18; B60W 10/20; B60W 10/26; B60W 2050/0292; B60W 2420/42; B60W 2420/52; B60W 2420/54; B60W 2554/4041; B60W 2554/4042; B60W 2554/4044; B60W 2710/06; B60W 2710/182; B60W 2710/186; B60W 2710/20; B60W 30/09; B60W 30/0956; B60W 50/0205; B60W 50/023; B60W 50/029; B60W 50/04; B60W 60/0015
  See application file for complete search history.

(56) References Cited

U.S. PATENT DOCUMENTS

| | | | |
|---|---|---|---|
| 10,521,974 B2* | 12/2019 | Du | B60W 50/0205 |
| 11,009,874 B2* | 5/2021 | Greenfield | B60W 50/029 |
| 11,086,996 B2* | 8/2021 | Rodriguez Bravo | G06F 21/566 |
| 11,151,076 B2* | 10/2021 | Otsuka | B60T 17/18 |
| 11,169,521 B2* | 11/2021 | Park | B60W 50/04 |
| 2002/0099487 A1 | 7/2002 | Suganuma et al. | |
| 2011/0313616 A1* | 12/2011 | Tsuchikiri | B60W 50/0205 701/33.7 |
| 2016/0114811 A1* | 4/2016 | Matsuno | B60W 50/0225 701/23 |
| 2016/0332624 A1* | 11/2016 | Tezuka | G08G 1/123 |
| 2019/0283768 A1* | 9/2019 | Das | B60W 30/16 |
| 2020/0047693 A1* | 2/2020 | Kistler | G08G 1/096775 |
| 2020/0231168 A1* | 7/2020 | Uthaicharoenpong | G07C 5/008 |

FOREIGN PATENT DOCUMENTS

| | | |
|---|---|---|
| DE | 60219705 T2 | 1/2008 |
| DE | 102006048910 A1 | 4/2008 |
| DE | 102014212289 A1 | 12/2015 |
| DE | 102013020177 A1 | 6/2018 |
| EP | 2792557 A1 | 10/2014 |
| JP | 2009220639 A | 10/2009 |
| JP | 5714133 B2 | 5/2015 |
| JP | 2017196965 A | 11/2017 |
| WO | 2016045652 A1 | 6/2016 |
| WO | 2016110464 A1 | 7/2016 |

\* cited by examiner

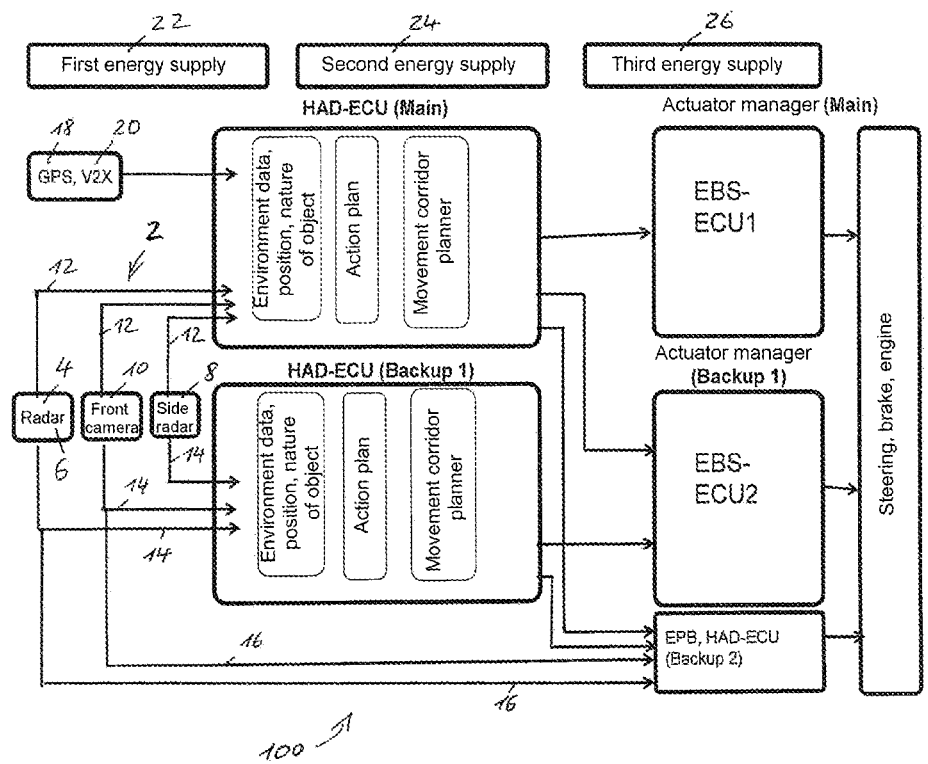

SYSTEM FOR THE AT LEAST PARTIALLY AUTONOMOUS OPERATION OF A MOTOR VEHICLE WITH DOUBLE REDUNDANCY

FIELD OF THE INVENTION

The present invention relates to a system by which at least partially autonomous operation of a motor vehicle is controlled, including at least a sensor device, with which environment data characterizing the environment of the motor vehicle can be generated, an electronic main control unit, which receives the environment data from the sensor device and, depending on the environment data, inputs adjusting commands into at least one device or into at least one actuator, which device or actuator is used in the at least partially autonomous operation of the motor vehicle, a first electronic backup control unit, which, in the event of a fault or failure of the electronic main control unit, receives the environment data from the sensor device and, depending on the environment data, inputs adjusting commands into the at least one device or into the at least one actuator, which device or actuator is used in the at least partially autonomous operation of the motor vehicle, and relates to a vehicle with such a system.

BACKGROUND INFORMATION

During "manual driving", the driver operates the motor vehicle with respect to its longitudinal and lateral guidance. Even if the longitudinal and lateral guidance can be assisted or even partially taken over by driver assistance systems, the driver remains responsible for the motor vehicle and it is up to him to monitor all of the essential operating functions.

Within a "partially automated driving" operating mode, there are known driver assistance systems which for example warn the driver of collisions and possibly also attempt to avoid collisions by making interventions. Examples of such driver assistance systems are an emergency braking assistant, a lane keeping assistant, a blindspot assistant, a parking assistant and so-called Automatic Cruise Control (ACC), in particular for driving on freeways.

By contrast, during "highly automated driving", responsibility is transferred at least for a time to a control system. The system for vehicle guidance is then configured such that it can take over the guidance of the vehicle completely, at least for a certain time and for example in a defined environment (for example on freeways). The driver is then also no longer obliged to monitor the control functions. Since, however, critical situations can then still arise (for example failure of the sensor system, confusing traffic situations, etc.), the system can also return responsibility for guidance to the driver. In order that this can happen, it must be ensured that the driver can take over the guidance of the motor vehicle again in a time window of a few seconds. The "highly automated driving" operating mode is thus distinguished by the fact that, at least for a defined time period and in specified situations, the driver does not have to monitor the guidance of the motor vehicle continuously. The driver must however remain able to take over the guidance of the motor vehicle again in an appropriate time. The "highly automated driving" operating mode can also be differentiated from the "manual driving" and "partially automated driving" operating modes by the fact that the vehicle in the "highly automated driving" operating mode drives fully automatically over a route input by way of a navigation system, wherein the vehicle is accelerated, braked and steered automatically by way of an electronic system.

Highly automated driving (HAD Highly Autonomous Driving) therefore presupposes knowledge of the surrounding area of the vehicle. For this purpose, the surrounding area is scanned or recorded with one or more sensors, such as radar, lidar, cameras, ultrasonic sensors or similar sensors known from the prior art. With the aid of the sensor measurements, the occupancy of the surrounding area by objects is then detected using signal processing methods that are likewise known in the prior art. The occupancy indicates that the vehicle cannot drive over a certain section of the surrounding area and at the same time indicates the position of the object. In addition, the type or nature of the objects is detected, that is to say whether pedestrians, vehicles, roadway delimitations, traffic lights etc. are concerned.

With the aid of the detected occupancies and the types of the objects, a surrounding area model is prepared, providing information or data on the occupancy of the surrounding area by objects, that is to say in particular the sections of the surrounding area that are occupied by objects and the type of objects.

According to the definition of SAE (Society of Automotive Engineers) J3016, the levels of automation when driving are summarized in 5 stages. The term "system" stands here either for one driver assistance system, a combination of individual driver assistance systems or a completely autonomous driving, braking and steering system. The level of automation becomes increasingly more comprehensive, beginning with systems that inform or warn the driver (Level 0), progressing through systems that either only take over the longitudinal or lateral guidance of the vehicle, with the driver always having the responsibility for observing the environment or intervening as a fallback solution (Level 1). Still more comprehensive automation is provided by Level 2 systems, which already take over the longitudinal and lateral guidance of the vehicle, whereas observation of the surrounding area and the fallback level still remain with the driver (Level 2). Systems of Level 3 guide the vehicle in an automated manner, without the driver observing the surrounding area, but the driver must still act as a fallback level. In Level 4, the system is already fully responsible for vehicle guidance and, in the event of failure, must provide corresponding system-related fallback solutions. Level 5 only differs from 4 in that the automated vehicle guidance must function under all conditions, with Level 4 this is confined to selected situations.

Commercial vehicles with highly automated driving functions that relieve the driver of the task of and responsibility for guidance, at least for a limited time, must, in the event of the occurrence of any given fault, continue the vehicle guidance until the driver takes over responsibility again. The "fail-safe" system property derived from this requires that basic functions such as braking and steering continue to be ensured, possibly with functional restrictions. This means that for example, in the event of any given fault, the vehicle must be able at least within certain limits to continue to be braked and steered in an electronically controlled manner.

A method of the type in question and a device of the type in question are discussed in DE 10 2013 020 177 A1. Provided there for at least partially autonomous operation of a motor vehicle are a sensor system for generating environment information, a main control unit and a backup control unit, wherein in a nominal operating state the main control unit takes over activation of the sensor systems and, in the event of a failure of the main control unit, the backup control unit takes over the activation of the sensor systems.

Under some circumstances, the phase during which the main control unit has failed and the backup control unit must then control the vehicle at least partially autonomously may last a long time, as a result of which there is a certain probability of further safety-critical faults occurring.

SUMMARY OF THE INVENTION

An object of the present invention is consequently to develop a system of the nature mentioned at the beginning further in such a way that it has greater functional reliability. The object of the invention is therefore the at least partially automated guidance of a motor vehicle.

This object may be achieved by the devices as described herein.

Further advantageous refinements and developments of the invention are provided by the further descriptions herein.

The present invention is based on a system by which at least partially autonomous operation of a motor vehicle is controlled, including at least a sensor device, with which environment data characterizing the environment of the motor vehicle can be generated, an electronic main control unit, which receives the environment data from the sensor device and, depending on the environment data, inputs (electrical) adjusting commands into at least one device or into at least one actuator, which device or actuator is used in the at least partially autonomous operation of the motor vehicle, a first electronic backup control unit, which, in the event of a fault or failure of the electronic main control unit, receives the environment data from the sensor device and, depending on the environment data, inputs (electrical) adjusting commands into the at least one device or into the at least one actuator, which device or actuator is used in the at least partially autonomous operation of the motor vehicle.

At least partially autonomous operation of the motor vehicle is intended here as meaning operation at least under Level 3 or under a comparatively higher Level 4 or 5 according to SAE J3016, which was described at the beginning.

When implementing at least partially autonomous operation of the motor vehicle, failures and degradations of control devices, sensor systems and actuator systems must always be expected. Measures presented here for preventing total system failures are redundant control units, which may also be supplemented by (partially) redundant data transmission, (partially) redundant sensors and (partially) redundant actuators. Said measures represent "fail-safe" methods, which are intended to bring the motor vehicle into a safe state. This is so since, during at least partially autonomous driving operation, the driver is completely relieved of guiding the motor vehicle, at least for some time, so that he cannot contribute to reliably bringing the motor vehicle into the safe state.

According to the invention, therefore, a second electronic backup control unit is provided, which, in the event of a fault or failure of the electronic main control unit and the first electronic backup control unit, receives the environment data from the sensor device and, depending on the environment data, inputs (electrical) adjusting commands into the at least one device or into the at least one actuator, which device or actuator is used in the at least partially autonomous operation of the motor vehicle.

Inputting (electrical) adjusting commands into the at least one device or into the at least one actuator, which device or actuator is used in the at least partially autonomous operation of the motor vehicle, is intended to be understood as meaning that the adjusting commands are either input directly into the actuator, which is possible for example in the case of an electrical steering actuator, or else that the adjusting commands are first input into an electronic controller of the respective device, which then turns the adjusting commands into corresponding control commands of the actuators of the respective device.

This may be the case for example with the electronic service brake device, which for example has an electronic service brake controller and pneumatic service brake actuators, which are electrically controlled by the electronic service brake controller, for example by at least one electropneumatic pressure control module. Such an electropneumatic pressure control module includes for example a local electronic controller, an inlet/outlet valve combination, a backup valve and also a relay valve, which can be controlled by the inlet/outlet valve combination and the backup valve and the working output of which is then connected to at least one pneumatic service brake actuator and also to an integrated pressure sensor, which reports the measured actual brake pressure to the local controller for comparison with a setpoint brake pressure, which is provided by the brake request signal of the electronic service brake controller.

The reason for the failure or the fault of the electronic main control unit and/or of the first electronic backup control unit may be that the electronic main control unit and/or the first electronic backup control unit (each) have a fault or else have failed, and/or that at least one electrical power supply of the electronic main control unit and of the first electronic backup control unit has a fault or has failed.

During a the first backup phase, in which the first electronic backup control unit takes over the (partially) autonomous guidance of the motor vehicle instead of the failed electronic main control unit, the first electronic backup control unit may either for example replace or provide all of the braking and steering functions that the electronic main control unit provided or else only some of these functions (degradation).

If in the first backup phase, in which the first electronic backup control unit has already taken over the (partially) autonomous guidance of the motor vehicle instead of the failed electronic main control unit, there is then also a failure or fault of the first electronic backup control unit, the second electronic backup control unit takes over the at least partially autonomous guidance of the motor vehicle during a second backup phase. This at least partially autonomous guidance of the motor vehicle during the second backup phase by the second electronic backup control unit may then in turn either for example replace or provide all of the braking and steering functions that the first electronic backup control unit provided or else only some of these functions (degradation).

The at least partially autonomous guidance of the motor vehicle during the first backup phase and the second backup phase may therefore be confined for example to autonomous braking supplemented by autonomous steering. The autonomously performed functions during the first backup phase and the second backup phase may have different complexities and range from merely autonomous braking of the motor vehicle with the aid of the parking brake actuators to autonomous guidance of the motor vehicle along complex driving trajectories by combined intervention for example in the service brake device/steering device/engine control.

In particular, the electronic main control unit, the first electronic backup control unit and the second electronic backup control unit are control units that are independent and separate from one another.

Altogether, therefore, the second backup level or the second backup phase, which is provided by the second electronic backup control unit, has the effect of increasing the functional reliability of the system.

Advantageous developments and improvements of the invention specified herein as further provided by the measures set out in the further descriptions herein.

The at least one device or the at least one actuator, which device or actuator is used in the at least partially autonomous operation of the motor vehicle, may be in particular at least one of the following actuators or devices: an electronic service brake device with at least one electronic service brake controller and with at least one electrically actuable service brake actuator, an electrical parking brake device with an electronic parking brake controller and with at least one parking brake actuator, an electrical steering device with an electrical steering actuator and also an electronic engine controller, which controls an engine of the motor vehicle. The engine of the motor vehicle may be in particular an internal combustion engine and/or an electric motor.

Particularly, the system by which the at least partially autonomous operation of the motor vehicle is controlled therefore may include at least an electronic service brake device with at least one electronic service brake controller and with at least one electrically actuable service brake actuator, an electrical parking brake device with an electronic parking brake controller and with at least one parking brake actuator, an electrical steering device with an electrical steering actuator, an electronic engine controller, which controls an engine of the motor vehicle, a sensor device, with which environment data characterizing the environment of the motor vehicle can be generated, an electronic main control unit, which receives the environment data from the sensor device and, depending on the environment data, inputs adjusting commands into the electronic service brake device and/or the electrical parking brake device and/or the electrical steering device and/or into the electronic engine controller, a first electronic backup control unit, which, in the event of a fault or failure of the electronic main control unit, receives the environment data from the sensor device and, depending on the environment data, inputs electrical adjusting commands into the electronic service brake device and/or the electrical parking brake device and/or the electrical steering device and/or into the electronic engine controller, and also a second electronic backup control unit, which, in the event of a fault or failure of the electronic main control unit, and at the same time of the first electronic backup control unit, receives the environment data from the sensor device and, depending on the environment data, inputs adjusting commands at least into the electronic service brake device and/or the electrical parking brake device and/or the electrical steering device and/or into the electronic engine controller.

Inputting adjusting commands at least into the electronic service brake device and/or into the electrical parking brake device and/or into the electrical steering device and/or into the electronic engine controller is intended to be understood as meaning that the adjusting commands are either input directly into the respective electrically actuable actuators, which is possible for example in the case of an electrical steering actuator, or else that the adjusting commands are first input into an electronic controller of the respective device, which then converts the adjusting commands into corresponding control commands of the actuators of the respective device or passes them on.

According to a particular embodiment, the second electronic backup control unit comprises the electronic parking brake controller or is formed by it, wherein, in the event of a fault or failure of the electronic main control unit and the first electronic backup control unit, the electronic parking brake controller receives the environment data from the sensor device and, depending on the environment data, actuates at least the parking brake actuators of the electrical parking brake device. In particular, only the parking brake actuators of the electrical parking brake device are actuated, or at least partially applied or else completely applied, by the electronic parking brake controller during the second backup phase, without however the electronic service brake device or the electrical steering device or the electronic engine controller being activated. Consequently, at least during the second backup phase, the degradation of the functions already described above takes place, in that the motor vehicle is brought to a standstill and is then kept at a standstill without further steering intervention with the aid of the parking brake device. As a result, a safe state of the motor vehicle is achieved.

Consequently, here an electrical parking brake device or its electronic parking brake controller that is generally present in any case in a motor vehicle performs an advantageous dual function, in that on the one hand it is actuated manually by the will of the driver, as previously, or else actuated independently of the driver in an automated manner within the driver assistance system such as the hillholder function or starting assistant, and on the other hand however, depending on the environment data, also controls at least the parking brake actuators as a control unit of the at least partially autonomous system.

The electronic parking brake controller may in particular communicate directly with the sensor device, in that signal lines are laid directly from the sensor device to the electronic parking brake controller. Also conceivable, alternatively, is an indirect data link by databus, to which then the electronic parking brake controller, the sensor device and under some circumstances still further bus devices are connected.

The electronic parking brake controller is formed in particular such that it actuates the parking brake actuators in response to the adjusting commands, irrespective of whether the motor vehicle is in a driving state or at a standstill. Consequently, the motor vehicle that is for example still traveling during the second backup phase is braked to a standstill by the parking brake device or by its parking brake actuators and is then kept there by the applied parking brake actuators. If, however, the motor vehicle has already reached a standstill right at the beginning of the second backup phase, the electronic parking brake controller applies the parking brake actuators in order to ensure that the motor vehicle is at a standstill.

The electrical steering device may be configured in particular with or without a continuous mechanical connection between a steering wheel and a steering gear mechanism. The electrical steering device may include an electronic steering controller, into which the adjusting commands are input and which then implements the adjusting commands in the electrical steering actuator as a steering adjuster. Alternatively, the adjusting commands may also be input directly into the electrical steering actuator.

At least the electronic main control unit and/or the first electronic backup control unit may be formed such that, on the basis of the environment data, at least a position and/or a speed and/or a nature of an object located in an environment of the motor vehicle is detected and, as a reaction to the detection of the position and/or the speed and/or the nature of the at least one object, a movement corridor is determined for the further movement of the motor vehicle, wherein then, depending on the movement corridor determined, the electrical adjusting commands are generated. The determination of the nature of the at least one detected object includes for example an identification or classification of the at least one object.

According to a development, the at least one electronic service brake controller of the electronic service brake device receives the adjusting commands from the electronic main control unit or from the first electronic backup control unit and is provided with open-loop or closed-loop control routines, by which, depending on the adjusting commands, the at least one electrically actuable service brake actuator and/or the electrical steering device and/or the electronic engine controller can be controlled in an open-loop or closed-loop manner. Consequently, the at least one electronic service brake controller of the electronic service brake device may be connected between the electronic main control unit and the first electronic backup control unit and the electrically actuable service brake actuator and/or the electrical steering device and/or the electronic engine controller. The electronic service brake controller of the electronic service brake device is then connected by signal lines to the at least one electrically actuable service brake actuator and/or to the electrical steering device and/or to the electronic engine controller.

For example, routines of at least one driving dynamics control system, such as ESP, ABS, ASR etc., may be integrated in the at least one electronic service brake controller of the electronic service brake device, wherein the adjusting commands that are input into the at least one electronic service brake controller may be adapted there, depending on the routines of the at least one driving dynamics control system.

Since the routines of the driving dynamics control are in any case usually implemented in an electronic service brake controller, there is no need for the electronic service brake controller to be modified fundamentally or the driving dynamics control for instance to be additionally implemented in the electronic main control unit or in the first electronic backup control unit. To this extent it may be provided for there to be a separation between generation of the (raw) adjusting commands within the electronic main control unit and in the first electronic backup control unit for the at least partially autonomous operation of the motor vehicle and an adaptation or modification of these adjusting commands, taking place under some circumstances, within the at least one electronic service brake controller and the subsequent distribution among the aforementioned devices.

According to a development, at least a first service brake controller and a second service brake controller may be provided within the electronic service brake device, wherein the first service brake controller and the second service brake controller are separate controllers and the first service brake controller receives adjusting commands from the electronic main control unit and the second service brake controller receives adjusting commands from the first electronic backup control unit.

With regard to the functional scope, the first service brake controller and the second service brake controller may for example activate the service brake actuators of the electronic service brake device wheel-specifically or axle-specifically.

In particular, the first service brake controller controls the service brake actuators of the electronic service brake device wheel-specifically and the second service brake controller controls the service brake actuators of the electronic service brake device axle-specifically.

The last-mentioned case of axle-specific control of the service brake actuators of the electronic service brake device by the second service brake controller may be implemented for example, as discussed in WO 2016/045652 A1, from the applicant of the patent application in the present case, by the electronic service brake device (brake-pressure-controlled electronic braking system EBS) including an electropneumatic service brake valve device BBV, the first service brake controller (referred to there as EBS-ECU), electropneumatic pressure control modules and also pneumatic wheel brake actuators, wherein the electropneumatic service brake valve device BBV has a service brake actuating element and also, within at least one electrical service brake circuit, at least one electrical channel with at least one electrical braking-value sensor, which can be actuated by the service brake actuating element, for outputting actuating signals depending on an actuation of the service brake actuating element, and also the second service brake controller (referred to there as FBM-ECU), which receives the actuating signals and, depending on the actuating signals, inputs brake request signals into the first service brake controller (referred to there as EBS-ECU), and also, within at least one pneumatic service brake circuit, two pneumatic channels, to be specific a front-axle channel and a rear-axle channel, in the case of which a control piston of the service brake valve device is respectively loaded with a first actuating force by actuation of the service brake actuating element on the basis of a driver brake request and the control piston directly or indirectly controls at least one double-seat valve of the service brake valve device BBV, including an inlet seat and an outlet seat, in order to generate pneumatic braking pressures or braking control pressures for the pneumatic wheel brake actuators, and wherein means for generating a second actuating force independently of a driver brake request, including the second electronic service brake controller (referred to there as FBM-ECU) of the electropneumatic service brake valve device, are provided and, in the presence of a brake request independent of the driver's wishes, acts on the at least one control piston in the same sense or in the opposite sense with respect to the first actuating force.

Consequently, the pneumatic or electropneumatic service brake valve device that is always present in an electropneumatic and electronic service brake device may be modified such that on the one hand it makes electrical sensing of the brake pedal position possible and on the other hand can generate or modify the brake pressures output by the two pneumatic channels of the service brake valve device independently of a brake pedal actuation, to be specific here by the second service brake controller and for example by an electropneumatic valve device controlled by the latter, which then generates the second actuating force.

The pneumatic part of this then "active" electropneumatic service brake valve device BBV functions like a conventional service brake valve of a pneumatic service brake device and, governed by the control by the second service brake controller, generates in a two-circuit manner pneumatic brake pressures or brake control pressures in the two pneumatic service brake circuits of the electropneumatic service brake device. The "active" electropneumatic service brake valve device BBV also includes a sensor system for sensing the driver brake request in the form of an electrical braking-value sensor. This sensor system is a component part of the electrical channel of the "active" electropneumatic service brake valve device BBV or of the electrical service brake circuit of the electropneumatic service brake device BBV and in fault-free operation transmits to it the service brake request of the driver that the latter inputs by way of the service brake pedal.

In order that, even in the event of a fault or failure of the electrical service brake circuit of the electronic service brake device, which then comprises the first service brake controller, the adjusting commands of the second electronic service brake controller can be implemented within the first backup phase, the brake pressures or brake control pressures that are input into the two pneumatic service brake circuits (front-axle brake circuit, rear-axle brake circuit) by the second service brake controller may therefore be used within the first backup phase for axle-specific control of the pneumatic service brake actuators at the front axle and rear axle of the motor vehicle.

The functional reliability of the system is increased still further if for example a first electrical energy supply is provided, supplying electrical energy to at least the sensor device, the electronic main control unit and the first service brake controller, and if a second energy supply, independent of the first electrical energy supply, is provided, supplying electrical energy to at least the sensor device, the first electronic backup control unit and the second service brake controller, and if a third energy supply, independent of the first electrical energy supply and the second electrical energy supply, is provided, supplying electrical energy to at least the second electronic backup control unit.

As already mentioned above, the electronic service brake device may be in particular an electropneumatic service brake device with electropneumatic pressure control modules and with pneumatic service brake actuators, in the case of which the pneumatic brake pressure is controlled.

In particular, a detection of the fault or the failure of the electronic main control unit and/or of the first electronic backup control unit may take place by a respective self-monitoring, and/or by an external monitoring of the electronic main control unit by the first electronic backup control unit, or by an external monitoring of the first electronic backup control unit by the second electronic backup control unit.

The invention also relates to a vehicle, in particular a commercial vehicle, with a system described herein.

The invention is now explained by way of example with reference to the accompanying drawing on the basis of an exemplary embodiment. The single FIGURE shows a schematic representation of an exemplary embodiment of a system by which at least partially autonomous operation of a motor vehicle is controlled.

DETAILED DESCRIPTION

The FIGURE shows highly schematically a system 100, by which at least partially autonomous operation of a motor vehicle is controlled in an open-loop or closed-loop manner.

At least partially autonomous operation of the motor vehicle is intended here to be understood as meaning for example operation at least under Level 3 or under a comparatively higher Level 4 or 5 according to SAE J3016, which was described at the beginning.

The system 100 comprises a sensor device 2, with which environment data characterizing the environment of the motor vehicle can be generated, such as for example concerning stationary or moving objects that are located in the environment of the motor vehicle. For this purpose, the sensor device 2 comprises for example a front radar 4 on its front side, a rear radar 6 on its rear side, on each side a side radar 8 and also a front camera 10. However, still further sensors, such as for example infrared sensors, are conceivable.

The sensor data of the sensor device 2, which represent the environment data, are input for example by way of signal lines 12 into an electronic main control unit HAD-ECU, Main and processed there.

Furthermore, the sensor data of the sensor device are also input by way of further signal lines 14, 16 into a first electronic backup control unit HAD-ECU, Backup 1 as well as also into a second electronic backup control unit HAD-ECU, Backup 2 and processed there.

Furthermore, on board the motor vehicle there is also a GPS 18, which determines the current positional data of the motor vehicle. Not least, on board the motor vehicle there is also a receiver, which receives data from other motor vehicles and/or from stationary transmitters as part of vehicle-to-X communication V2X 20, including for example information and data concerning motor vehicles driving in front and concerning the route traveled. These data are for example only input here into the electronic main control unit HAD-ECU, Main.

Implemented within the electronic main control unit HAD-ECU, Main and also the first electronic backup control unit HAD-ECU, Backup 1 are routines which, on the basis of the environment data or the data, detect a position and/or a speed and/or a nature of at least one object located in an environment of the motor vehicle and, as a reaction to the detection of the position and/or the speed and/or the nature of the at least one object, carry out an action plan, such as for example "braking and evading the detected object". Furthermore, a movement corridor for the further movement of the motor vehicle is determined, wherein then, depending on the movement corridor determined, electrical adjusting commands are generated.

These electrical adjusting commands are then input by the electronic main control unit HAD-ECU, Main into a first electronic brake controller EBS-ECU1 and by the first electronic backup control unit HAD-ECU, Backup 1 into a second electronic brake controller EBS-ECU2, while this only comes into effect if the electronic main control unit HAD-ECU, Main is not operational.

The two electronic brake controllers EBS-ECU1 and EBS-ECU2 are component parts of an electronic service brake device, which is configured here for example as an electronically brake-pressure-controlled service brake system EBS. The electronic service brake device also includes pneumatic brake pressure actuators at the front axle and at the rear axle of the motor vehicle and for example two one-channel pressure control modules at the front axle and one two-channel pressure control module at the rear axle. The pneumatic brake pressure actuators are configured for example as pneumatic service brake cylinders and are arranged wheel-specifically.

Such an electropneumatic pressure control module includes for example a local electronic controller, an inlet/outlet valve combination for each channel, a backup valve and also a relay valve, which can be controlled by the inlet/outlet valve combination and the backup valve and the working output of which is then connected to at least one pneumatic service brake actuator and also to an integrated pressure sensor, which reports the measured actual brake pressure to the local controller for comparison with a setpoint brake pressure, which is provided by the service brake request signal output by the respective electronic service brake controller.

In the FIGURE, the "pressure control modules" and "pneumatic service brake actuators" components of the electronic service brake device are indicated in a simplified form as "brake", which can then be controlled independently by the two electronic brake controllers EBS-ECU1 and EBS-ECU2.

For example, routines of at least one driving dynamics control system, such as ESP, ABS, ASR etc., may be integrated in the two electronic service brake controllers EBS-ECU1 and EBS-ECU2 of the electronic service brake device EBS, wherein the adjusting commands that are input into the electronic service brake controllers EBS-ECU1 and EBS-ECU2 may be adapted there, depending on the routines of the at least one driving dynamics control system, in order for example to avoid unstable driving behavior, excessive brake slip and/or traction slip.

The first electronic service brake controller EBS-ECU1 may for example activate the pneumatic service brake actuators wheel-specifically, while the second electronic service brake controller EBS-ECU2 may only activate the pneumatic service brake actuators axle-specifically, i.e. separately for the front axle and the rear axle.

The system 100 also includes an electrical parking brake device EPB with an electronic parking brake controller EPB-ECU and with for example two parking brake actuators, which are configured here for example as pneumatic spring-loaded brake cylinders at the rear axle. The electronic parking brake controller EPB-ECU includes in particular a solenoid valve device, by which air can be introduced into or extracted from the spring-loaded brake cylinders. For example, the electronic parking brake controller EPB-ECU of the electrical parking brake device EPB forms here the second electronic backup control unit HAD-ECU, Backup2.

The electronic parking brake controller EPB-ECU is in turn connected by way of the signal lines 16 to the sensor device 2 and has routines which, depending on the environment data supplied by the sensor device 2, partially or completely apply or partially or completely release the pneumatic parking brake actuators. Here, the electronic parking brake controller EPB-ECU cannot however receive the signals of the side radars 8, the GPS 18 and the V2X 20.

In the FIGURE, the "parking brake actuators" components of the electrical parking brake device are indicated in a simplified form as "brake", which can then be controlled by the electronic parking brake controller EPB.

Furthermore, the system 100 also comprises an electrical steering device, which may be configured with or without a continuous mechanical connection between a steering wheel and a steering gear mechanism. The electrical steering device includes an electronic steering controller, into which the adjusting commands of the two electronic brake controllers EBS-ECU1 and EBS-ECU2 are input and which then implements the adjusting commands in the electrical steering actuator.

In the FIGURE, the "electronic steering controller" and "electrical steering actuator" components of the electrical steering device are indicated as "steering".

Not least, the system 100 also comprises an electronic engine controller, which controls an engine of the motor vehicle and is symbolized in the FIGURE by the designation "engine".

In order to increase the functional reliability of the system, a first electrical energy supply 22 is provided, supplying electrical energy for example to the sensor device 2, the electronic main control unit HAD-ECU, Main and the first service brake controller EBS-ECU1, furthermore a second energy supply 24, independent of the first electrical energy supply 22, supplying electrical energy for example to the sensor device 2, the first electronic backup control unit HAD-ECU, Backup1 and the second service brake controller EBS-ECU2. Furthermore, a third energy supply 26, independent of the first electrical energy supply 22 and the second electrical energy supply 24, is provided, supplying electrical energy to the second electronic backup control unit HAD-ECU, Backup2.

In particular, a detection of the fault or the failure of the electronic main control unit HAD-ECU, Main and of the first electronic backup control unit HAD-ECU, Backup1 takes place respectively by self-monitoring. Alternatively, an external monitoring of the electronic main control unit HAD-ECU, Main by the first electronic backup control unit HAD-ECU, Backup1 and an external monitoring of the first electronic backup control unit HAD-ECU, Backup1 by the second electronic backup control unit HAD-ECU, Backup2 may of course also take place.

In normal operation, the electronic main control unit HAD-ECU, Main receives the environment data from the sensor device 2 and data from the GPS 18 and from the V2X 20 and detects on the basis of these environment data a position and/or a speed and/or a nature of an object located in an environment of the motor vehicle. Furthermore, as a reaction to the detection of the position and/or the speed and/or the nature of the object and also the data from the GPS 18 and V2X 20, it carries out an action plan, such as for example "braking and evading the detected object". Furthermore, a movement corridor for the further movement of the motor vehicle is determined, wherein then, depending on the movement corridor determined, electrical adjusting commands are generated and are input into the first brake controller EBS-ECU1.

In the following, it will be assumed for example that the detected object is a pedestrian who is on the roadway in front of the motor vehicle and which the motor vehicle is now intended to evade by automatic intervention, which is referred to as an evasive maneuver.

The first electronic service brake controller EBS-ECU1 is provided with open-loop or closed-loop control routines, by which, depending on the adjusting commands, the service brake actuators, the electrical steering device and the electronic engine controller are controlled in an open-loop or closed-loop manner in such a way that the motor vehicle on the one hand is to some extent braked for example by engine braking and by partial application of the service brake actuators and on the other hand is steered past the pedestrian automatically, i.e. without any action on the part of the driver. In this way, the system controls the evasive maneuver as autonomous operation of the motor vehicle.

In the evasive maneuver, the first electronic service brake controller EBS-ECU1 may activate the pneumatic service brake actuators wheel-specifically, i.e. for each wheel individually, and as a result can for example carry out driving dynamics control (ESP) and wheel-specific brake slip control (ABS) during the braking.

If the electronic main control unit HAD-ECU then fails during the evasive maneuver, whether due to a fault in the first electrical energy supply 22 or a fault in the electronic main control unit HAD-ECU itself, this fault is established here for example by the self-monitoring of the main control unit HAD-ECU and is reported to the first electronic backup control unit HAD-ECU, Backup1. In response to this, the the first electronic backup control unit HAD-ECU, Backup1 for example switches off the main control unit HAD-ECU, in order that the fault cannot lead to adverse and unwanted effects.

Then the first electronic backup control unit HAD-ECU, Backup1 tries to bring to an end the already initiated evasive maneuver, in that for its part it inputs adjusting commands generated in response to the detected environment data into the second electronic service brake controller EBS-ECU2. The time phase during which the evasive maneuver is controlled by the first electronic backup control unit HAD-ECU, Backup1 will be referred to as the first backup phase.

Depending on the adjusting commands, the second electronic service brake controller EBS-ECU2 instead of the first electronic service brake controller EBS-ECU1, which of course can now no longer be activated by the defective electronic main control unit HAD-ECU, then activates for example the service brake actuators, the electrical steering device and the electronic engine controller, in order to continue the already initiated evasive maneuver and, if possible, bring it to an end.

Since the second electronic service brake controller EBS-ECU2 can for example only activate the pneumatic service brake actuators axle-specifically, i.e. separately for the front axle and the rear axle, the driving dynamics control (ESP) and the wheel-specific brake slip control (ABS) are absent in the service braking as part of the evasive maneuver, for which reason the service braking continued by the second electronic service brake controller EBS-ECU2 represents a degradation in comparison with the service braking initiated by the first electronic service brake controller EBS-ECU1. As an alternative to this, however, the second electronic service brake controller EBS-ECU2 could have the same functional scope with regard to its controlling capabilities as the first electronic service brake controller EBS-ECU1, so that then there is no degradation.

If, during the evasive maneuver continued by the first electronic backup control unit HAD-ECU, Backup1, the first electronic backup control unit HAD-ECU, Backup1 then also fails, whether due to a fault in the second energy supply 24 or a fault in the first electronic backup control unit HAD-ECU, Backup1 itself, this fault is established here for example by the self-monitoring of the first electronic backup control unit HAD-ECU, Backup1 and is reported to the second electronic backup control unit HAD-ECU, Backup2. In response to this, the second electronic backup control unit HAD-ECU, Backup2 for example switches off the first electronic backup control unit HAD-ECU, Backup1, in order that the fault cannot lead to adverse and unwanted effects.

Then the second electronic backup control unit HAD-ECU, Backup2, which is formed here for example by the electronic parking brake controller EPB, for example partially applies the parking brake actuators, so that as a result the motor vehicle assumed to be still traveling at the end of the first backup phase is braked.

The time phase during which the evasive maneuver is continued by the second electronic backup control unit HAD-ECU, Backup2 will be referred to here as the second backup phase.

For example, however, the electronic parking brake controller EPB is not capable of influencing the service brake device, which in any case is no longer operational, or the steering device or the engine control, so that a continuation of the evasive maneuver only consists here for example in applying the parking brake actuators. Consequently, in comparison with the first backup phase, the second backup phase is distinguished by a further degradation with respect to the functional scope. Alternatively, during the second backup phase there may also be no degradation in functional scope in comparison with the first backup phase.

When the motor vehicle has then come to a standstill, the parking brake actuators are completely applied, in order to achieve a safe state of the motor vehicle, so that the second backup phase, and consequently also the evasive maneuver, end with the parking brake actuators being applied completely, even if the originally planned evasive maneuver involved continuing travel, and then also resuming the originally planned route, after passing the pedestrian.

THE LIST OF REFERENCE SIGNS IS AS FOLLOWS

HAD ECU, Main Electronic main control unit
HAD-ECU, Backup1 First electronic backup control unit
HAD-ECU, Backup2 Second electronic backup control unit
EBS-ECU1 Second electronic service brake controller
EBS-ECU2 Second electronic service brake controller
EPB Electrical parking brake device
EPB-ECU Electronic parking brake controller
100 System
2 Sensor device
4 Front radar
6 Rear radar
8 Side radar
10 Front camera
12 Signal lines
14 Signal lines
16 Signal lines
18 GPS
20 V2X
22 First electrical energy supply
24 Second electrical energy supply
26 Third electrical energy supply

The invention claimed is:

1. A system for controlling at least partially autonomous operation of a motor vehicle, comprising: a) a sensor device with which environment data characterizing an environment of the motor vehicle is generated; b) an electronic main control unit, which receives the environment data from the sensor device, and, depending on the environment data, inputs adjusting commands into at least one device or into at least one actuator, which device or actuator is used in the at least partially autonomous operation of the motor vehicle; c) a first electronic backup control unit, which, for a fault or failure of the electronic main control unit, receives the environment data from the sensor device, and, depending on the environment data, inputs the adjusting commands into the at least one device or into the at least one actuator, which device or actuator is used in the at least partially autonomous operation of the motor vehicle; d) a second electronic backup control unit, which, for a fault or failure of the electronic main control unit and the first electronic backup control unit, receives the environment data from the sensor device, and, depending on the environment data, inputs the adjusting commands into the at least one device or into the at least one actuator, which device or actuator is used in the at least partially autonomous operation of the motor vehicle, a position device to determine current positional data of the motor vehicle; and a receiver to receive data from other motor vehicles and/or from stationary transmitters as part of vehicle-to-X (V2X) communication, including information and data concerning the other motor vehicles driving on the route travelled, the data being input into the electronic main control unit; wherein the electronic main control unit receives the environment data from the sensor device and data from the position device and from the V2X and detects based on the environment data a position and/or a speed and/or a nature of an object located in an environment of the motor vehicle, wherein as a reaction to the detection of the position and/or the speed and/or the nature of the object and also the data from the position device and the V2X, it carries out an action plan, and wherein a movement corridor for the further movement of the motor vehicle is determined, and depending on the movement corridor determined, electrical adjusting commands are generated and are input into a first brake controller.

2. The system of claim 1, wherein at least the electronic main control unit and/or the first electronic backup control unit is configured such that, based on the environment data, at least a position and/or a speed and/or a nature of at least one object located in an environment of the motor vehicle is detected and, as a reaction to the detection of the position and/or the speed and/or the nature of the at least one object, a movement corridor is determined for the further movement of the motor vehicle, wherein depending on the movement corridor determined, the adjusting commands are generated.

3. The system of claim 1, wherein a detection of the fault or the failure of the electronic main control unit and/or of the first electronic backup control unit takes place by at least one of:
   a respective self-monitoring; and/or
   an external monitoring of the electronic main control unit by the first electronic backup control unit, or by an external monitoring of the first electronic backup control unit by the second electronic backup control unit.

4. A system for controlling at least partially autonomous operation of a motor vehicle, comprising: a) an electronic service brake device with at least one electronic service brake controller with at least one service brake actuator; b) an electrical parking brake device with an electronic parking brake controller and with at least one parking brake actuator; c) an electrical steering device with an electrical steering actuator; d) an electronic engine controller to control an engine of the motor vehicle; e) a sensor device with which environment data characterizing an environment of the motor vehicle is generated; f) an electronic main control unit, which receives the environment data from the sensor device, and, depending on the environment data, inputs adjusting commands into the electronic service brake device and/or the electrical parking brake device and/or the electrical steering device and/or into the electronic engine controller; g) a first electronic backup control unit, which, for a fault or failure of the electronic main control unit, receives the environment data from the sensor device, and, depending on the environment data, inputs the adjusting commands into the electronic service brake device and/or the electrical parking brake device and/or the electrical steering device and/or into the electronic engine controller; and h) a second electronic backup control unit, which, for a fault or failure of the electronic main control unit and the first electronic backup control unit, receives the environment data from the sensor device, and, depending on the environment data, inputs the adjusting commands at least into the electronic service brake device and/or the electrical parking brake device and/or the electrical steering device and/or into the electronic engine controller; a position device to determine current positional data of the motor vehicle; and a receiver to receive data from other motor vehicles and/or from stationary transmitters as part of vehicle-to-X (V2X) communication, including information and data concerning the other motor vehicles driving on the route travelled, the data being input into the electronic main control unit; wherein the electronic main control unit receives the environment data from the sensor device and data from the position device and from the V2X and detects based on the environment data a position and/or a speed and/or a nature of an object located in an environment of the motor vehicle, wherein as a reaction to the detection of the position and/or the speed and/or the nature of the object and also the data from the position device and the V2X, it carries out an action plan, and wherein a movement corridor for the further movement of the motor vehicle is determined, and depending on the movement corridor determined, electrical adjusting commands are generated and are input into a first brake controller.

5. The system of claim 4, wherein the second electronic backup control unit includes the electronic parking brake controller or is formed by it, wherein, in for a fault or failure of the electronic main control unit and the first electronic backup control unit, the electronic parking brake controller receives the environment data from the sensor device, and, depending on the environment data, actuates at least the parking brake actuators of the electrical parking brake device.

6. The system of claim 5, wherein the electronic parking brake controller is configured such that it actuates the parking brake actuators in response to the adjusting commands, irrespective of whether the motor vehicle is in a driving state or at a standstill.

7. The system of claim 5, wherein the electronic parking brake controller communicates directly with the sensor device.

8. The system of claim 4, wherein the electrical steering device includes an electronic steering controller, into which the adjusting commands are input and which then implements the adjusting commands in the electrical steering actuator.

9. The system of claim 4, wherein the at least one electronic service brake controller of the electronic service brake device receives the adjusting commands of the electronic main control unit or of the first electronic backup control unit and is provided with open-loop or closed-loop control routines, by which, depending on the adjusting commands, the at least one service brake actuator and/or the electrical parking brake device and/or the electrical steering device and/or the electronic engine controller can be controlled in an open-loop or closed-loop manner.

10. The system of claim 4, wherein routines of at least one driving dynamics control system are integrated in the at least one electronic service brake controller of the electronic service brake device, wherein the adjusting commands that are input into the at least one electronic service brake controller are adapted there, depending on the routines of the at least one driving dynamics control system.

11. The system of claim 4, wherein at least a first service brake controller and a second service brake controller are provided within the electronic service brake device, wherein the first service brake controller and the second service brake controller are separate controllers and the first service brake controller receives adjusting commands from the electronic main control unit and the second service brake controller receives the adjusting commands from the first electronic backup control unit.

12. The system of claim 11, wherein the first service brake controller and the second service brake controller activate service brake actuators of the electronic service brake device wheel-specifically or axle-specifically.

13. The system of claim 4, wherein the electronic service brake device includes an electropneumatic service brake device with electropneumatic pressure control modules and with pneumatic service brake actuators, for which pneumatic brake pressure is controlled.

14. The system of claim 4, further comprising:
a first electrical energy supply to supply electrical energy to at least the sensor device, the electronic main control unit and a first service brake controller;
a second energy supply, which is independent of the first electrical energy supply, to supply electrical energy to at least the sensor device, the first electronic backup control unit and the second service brake controller; and
a third energy supply, which is independent of the first electrical energy supply and the second electrical energy supply, to supply electrical energy to at least the second electronic backup control unit.

15. A vehicle or a commercial vehicle, comprising: a system for controlling at least partially autonomous operation of a motor vehicle, including: a) a sensor device with which environment data characterizing an environment of the motor vehicle is generated; b) an electronic main control unit, which receives the environment data from the sensor device, and, depending on the environment data, inputs adjusting commands into at least one device or into at least one actuator, which device or actuator is used in the at least partially autonomous operation of the motor vehicle; c) a first electronic backup control unit, which, for a fault or failure of the electronic main control unit, receives the environment data from the sensor device, and, depending on the environment data, inputs the adjusting commands into the at least one device or into the at least one actuator, which device or actuator is used in the at least partially autonomous operation of the motor vehicle; and d) a second electronic backup control unit, which, for a fault or failure of the electronic main control unit and the first electronic backup control unit, receives the environment data from the sensor device, and, depending on the environment data, inputs the adjusting commands into the at least one device or into the at least one actuator, which device or actuator is used in the at least partially autonomous operation of the motor vehicle, a position device to determine current positional data of the motor vehicle; and a receiver to receive data from other motor vehicles and/or from stationary transmitters as part of vehicle-to-X (V2X) communication, including information and data concerning the other motor vehicles driving on the route travelled, the data being input into the electronic main control unit; wherein the electronic main control unit receives the environment data from the sensor device and data from the position device and from the V2X and detects based on the environment data a position and/or a speed and/or a nature of an object located in an environment of the motor vehicle, wherein as a reaction to the detection of the position and/or the speed and/or the nature of the object and also the data from the position device and the V2X, it carries out an action plan, and wherein a movement corridor for the further movement of the motor vehicle is determined, and depending on the movement corridor determined, electrical adjusting commands are generated and are input into a first brake controller.

* * * * *